(12) United States Patent
Tucker

(10) Patent No.: US 11,928,264 B2
(45) Date of Patent: Mar. 12, 2024

(54) FIXED USER INTERFACE NAVIGATION

(71) Applicant: Lenovo (Singapore) Pte. Ltd., Singapore (SG)

(72) Inventor: Matthew Tucker, Chapel Hill, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 11 days.

(21) Appl. No.: 17/552,990

(22) Filed: Dec. 16, 2021

(65) Prior Publication Data

US 2023/0195233 A1 Jun. 22, 2023

(51) Int. Cl.
| | |
|---|---|
| G06F 3/0482 | (2013.01) |
| G06F 1/16 | (2006.01) |
| G06F 3/01 | (2006.01) |
| G06F 3/0346 | (2013.01) |
| G06F 3/0485 | (2022.01) |
| G06F 9/451 | (2018.01) |
| G04G 9/00 | (2006.01) |

(52) U.S. Cl.
CPC .............. *G06F 3/017* (2013.01); *G06F 1/163* (2013.01); *G06F 3/011* (2013.01); *G06F 3/0346* (2013.01); *G06F 3/0482* (2013.01); *G06F 3/0485* (2013.01); *G06F 9/451* (2018.02); *G04G 9/007* (2013.01)

(58) Field of Classification Search
CPC .......... G06F 3/017; G06F 1/163; G06F 3/011; G06F 3/0346; G06F 3/0482; G06F 3/0485; G06F 9/451; G04G 9/007
See application file for complete search history.

(56) References Cited

U.S. PATENT DOCUMENTS

| | | | | |
|---|---|---|---|---|
| 2005/0212756 A1* | 9/2005 | Marvit | ................ | G06F 1/1694 345/156 |
| 2009/0303204 A1* | 12/2009 | Nasiri | ................ | A63F 13/211 345/184 |
| 2011/0149266 A1* | 6/2011 | Motzer | ............... | G01C 25/005 342/463 |
| 2013/0335595 A1* | 12/2013 | Lee | ........................ | H04N 23/80 348/231.5 |
| 2015/0062178 A1* | 3/2015 | Matas | ................ | G06F 3/04845 345/648 |
| 2015/0185824 A1* | 7/2015 | Mori | ...................... | G06F 3/017 345/156 |
| 2020/0387228 A1* | 12/2020 | Ravasz | .............. | G06F 3/04842 |
| 2021/0219095 A1* | 7/2021 | Iyer | ...................... | H04W 4/023 |

* cited by examiner

*Primary Examiner* — Phenuel S Salomon
(74) *Attorney, Agent, or Firm* — Ference & Associates LLC

(57) ABSTRACT

One embodiment provides a method, including: identifying, on an information handling device, a fixed user interface; presenting, on a display of the information handling device, a view of a portion of the fixed user interface; determining, using a processor, whether movement of the information handling device is detected; and updating, responsive to determining that movement of the information handling device is detected, the view on the display with another portion of the fixed user interface. Other aspects are described and claimed.

16 Claims, 5 Drawing Sheets

FIXED USER INTERFACE NAVIGATION

BACKGROUND

Individuals utilize their information handling devices ("devices"), for example wearable devices, smart phones, tablets, hybrid devices, and the like, to interact with various types of content displayed on an integrated display of those devices. Conventionally, users navigate through the content via interaction with a user interface. For example, users can provide touch or stylus inputs to the display to select content, manipulate it, delete it, and/or create new content.

BRIEF SUMMARY

In summary, one aspect provides a method, including: identifying, on an information handling device, a fixed user interface; presenting, on a display of the information handling device, a view of a portion of the fixed user interface; determining, using a processor, whether movement of the information handling device is detected; and updating, responsive to determining that movement of the information handling device is detected, the view on the display with another portion of the fixed user interface.

Another aspect provides an information handling device, including: a display; a processor; a memory device that stores instructions executable by the processor to: identify a fixed user interface; present, on the display, a view of a portion of the fixed user interface; determine whether movement of the information handling device is detected; and update, responsive to determining that movement of the information handling device is detected, the view on the display with another portion of the fixed user interface.

A further aspect provides a product, including: a storage device that stores code, the code being executable by a processor and comprising: code that identifies a fixed user interface on an information handling device; code that presents a view of a portion of the fixed user interface; code that determines whether movement of the information handling device is detected; and code that updates, responsive to determining that movement of the information handling device is detected, the view on the display with another portion of the fixed user interface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
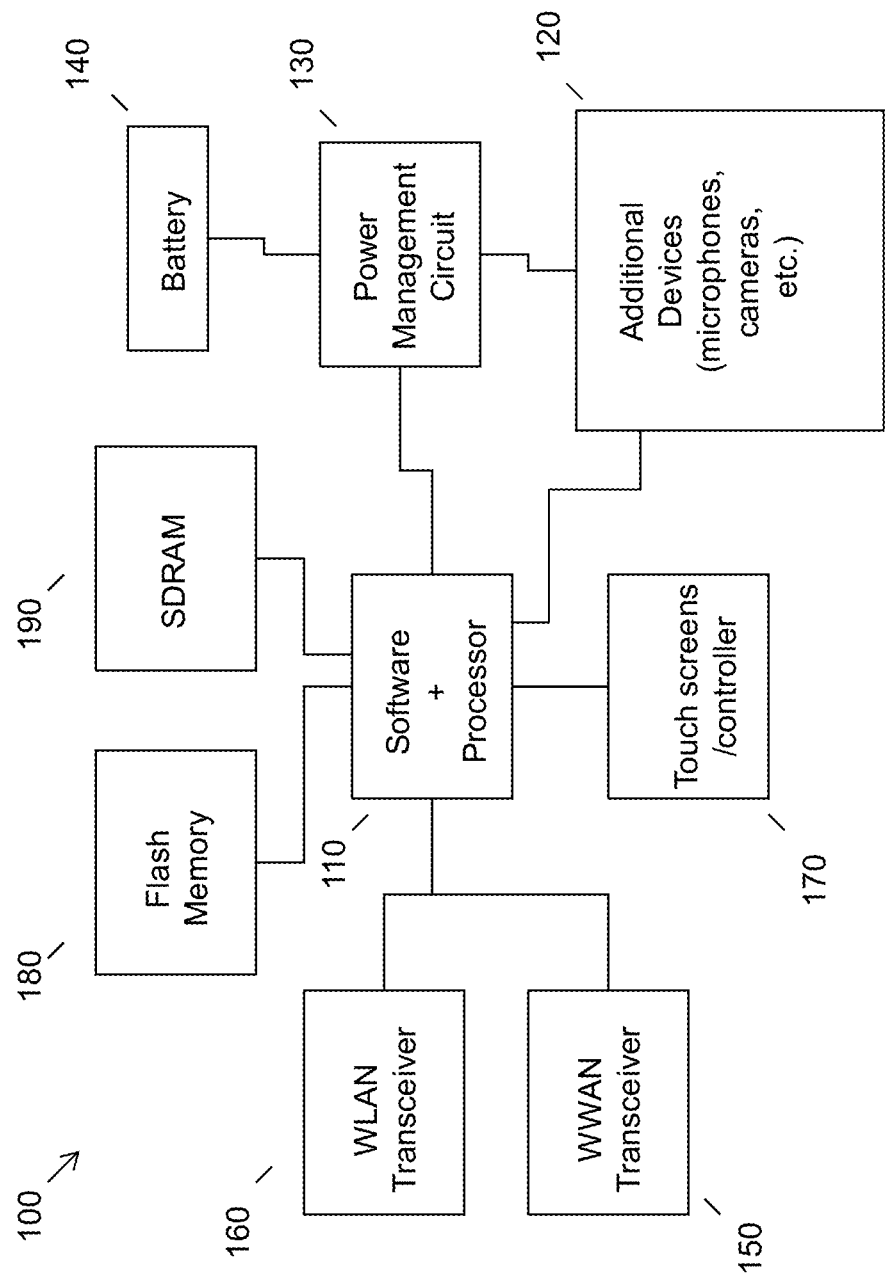
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices having smaller displays (e.g., wearable devices like smart watches, etc.) face a variety of unique challenges with respect to content presentation. More particularly, because the display on these devices is much smaller than that of other common user devices (e.g., smart phones, tablets, etc.), it is difficult to offer on-par functionality. One common issue that is frequently encountered is that it is difficult to display enough content while simultaneously enabling the user to effectively interact with that content on the small screen. For instance, a user that interacts with their smart watch via touch input will likely block a large portion of the displayed content because the screen is so small.

At present, most small electronic devices like smart watches and smart phones rely predominately on touch or stylus screen inputs. Some devices contain secondary or peripheral elements that may provide additional interaction means. For example, many smart watches employ hard buttons, rotating crowns, and/or rotating bezels. These physical elements allow users to scroll through content, select options from a list, adjust aspects of the device (e.g., volume, screen brightness, etc.), activate pre-configured applications, and the like, without requiring a user to physically interact with the display screen.

There are, however, a variety of issues with these conventional device interaction techniques. For instance, a primary issue is that they require two hands (e.g., one hand to wear a watch and the other hand to tap on the screen or interact with the physical element, etc.). This requirement may be burdensome to a user, especially if they are engaged in an activity that requires the use of at least one hand. Another issue associated with hard buttons is that their orientation is permanently fixed, so they restrict the design of the user interface. For example, a smart watch with a rotating crown on its side is likely to have a user interface that is configured to scroll only in the vertical direction.

Scrolling in a clockwise/counterclockwise axis would not be optimal given this hardware feature. The cumulative nature of these issues limits the design flexibility of the wearable device, introduces visual clutter to the device design, increases manufacturing costs, and also increases complexity of the hardware.

Accordingly, an embodiment provides a method for easy, fast, and powerful interface control on small electronic devices. In an embodiment, a system of a device may identify a fixed user interface (i.e., a user interface that is fixed at a single location in space). An embodiment may then present a view of a portion of the fixed user interface on a display of the device. Responsive to determining that movement of the device is detected, an embodiment may update the view of the display with another portion of the fixed user interface. Such a method enables a user to navigate through content much quicker than by conventional means.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
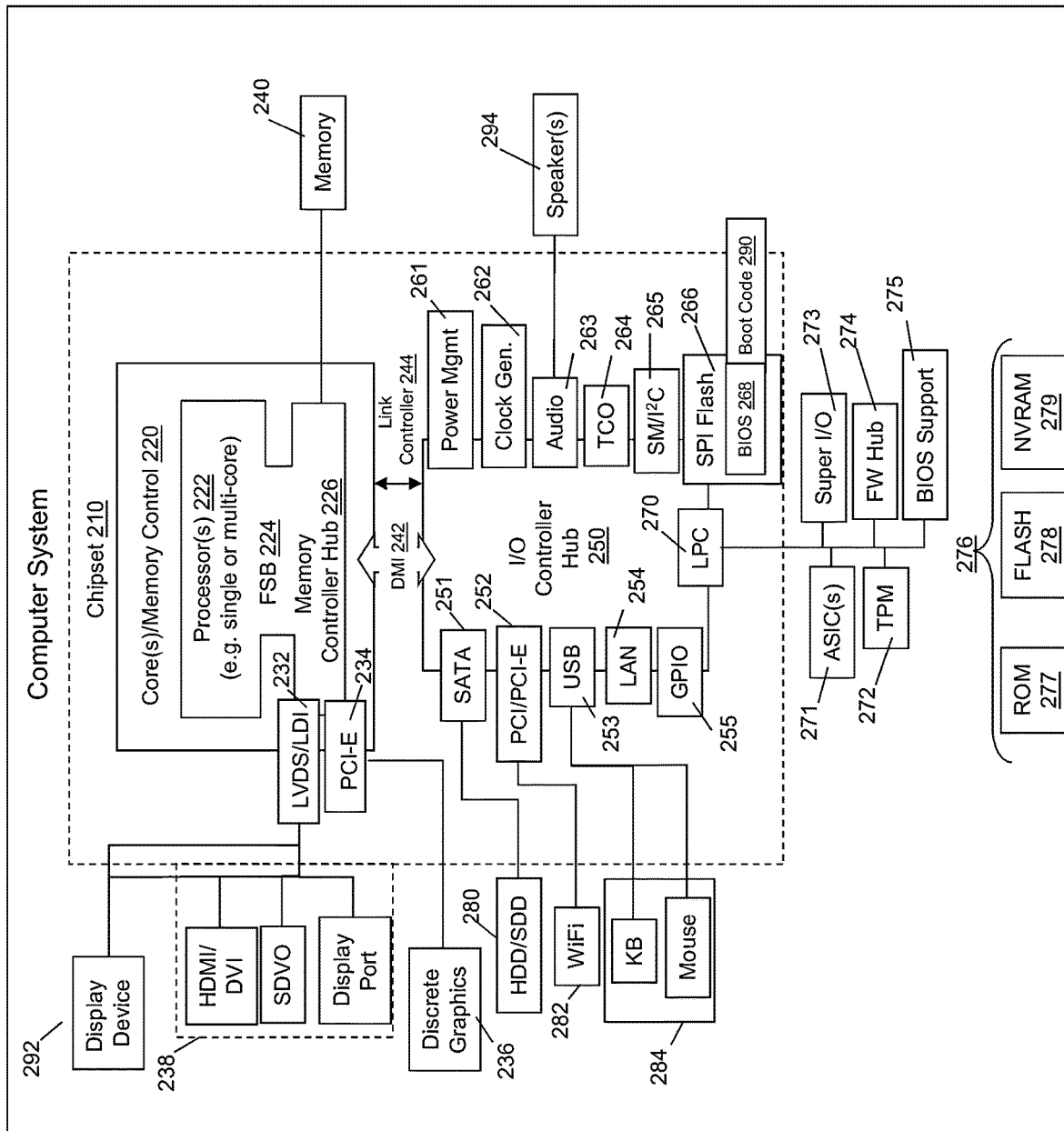
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in virtually any mobile device comprising a display. For example, the circuitry outlined in FIG. 1 may be implemented in a wearable device, whereas the circuitry outlined in FIG. 2 may be implemented in a smart phone.

Figure 3:
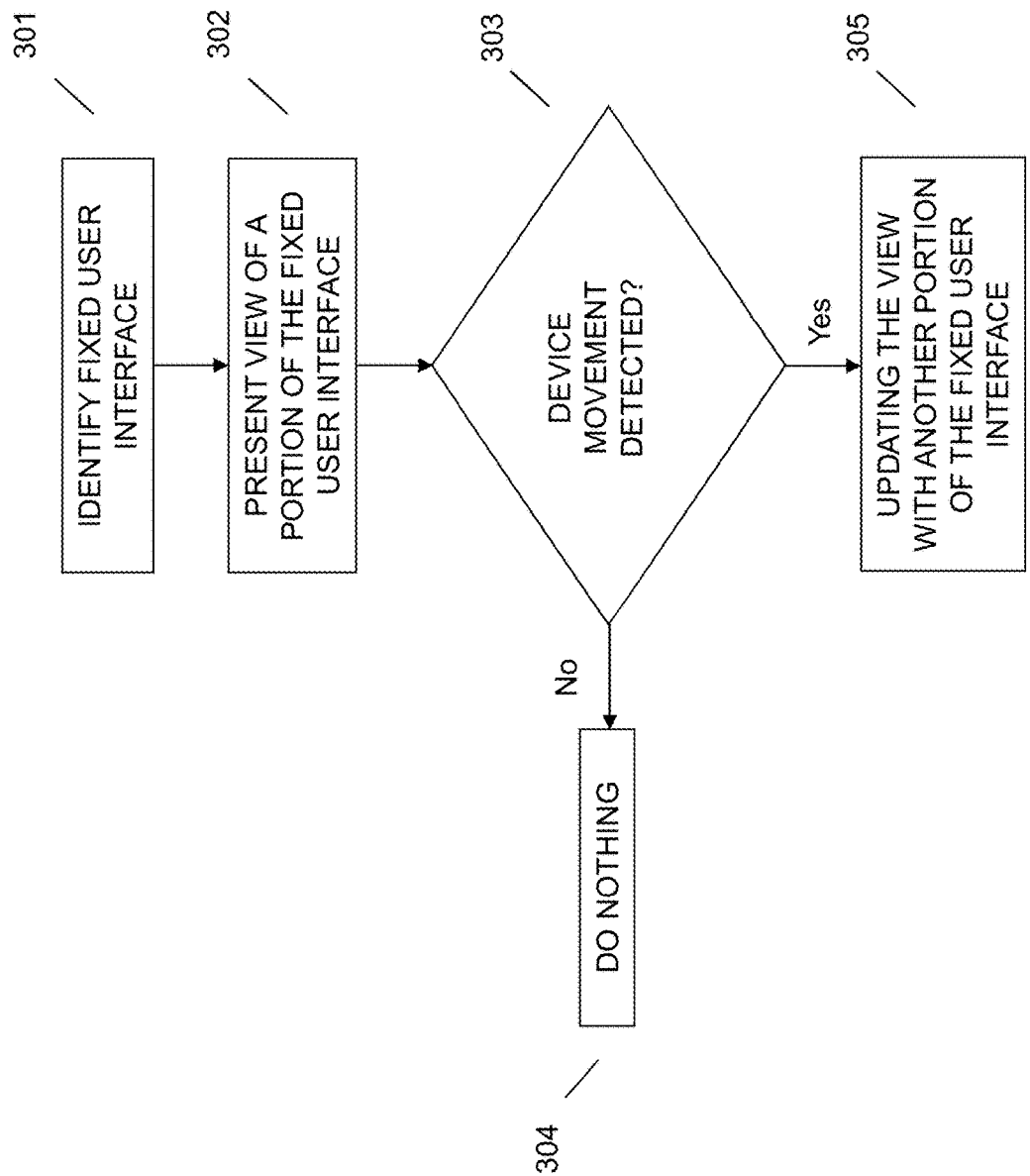
FIG. 3 illustrates an example method of navigating a user interface that is fixed in space.

Referring now to FIG. 3, an embodiment is disclosed for fast and easy user interface navigation. At 301, an embodiment may identify a fixed user interface on a device. In the context of this application, a fixed user interface may correspond to a user interface that is fixed at a specific location in physical space. The fixed user interface may operate substantially identically to a conventional user interface in that virtually any type of content can be presented on it (e.g., icons on a home screen, applications, images, videos, messages, etc.). For simplicity purposes, the remainder of this disclosure is described with reference to a wearable device, such as a smart watch. However, it is important to note that this designation is not limiting and that the inventive concepts described herein may be applicable to virtually any type of mobile device having a display and that can support a fixed user interface.

In an embodiment, the origin position of the fixed user interface may be reset each time a predetermined reset gesture is detected. In the context of this application, the origin position may correspond to the starting position of the fixed user interface from which subsequent movement stems from. In an embodiment, the predetermined reset gesture may be virtually any gesture established by the user. For instance, in a non-limiting example, the origin position of the user interface may be reset each time the user lifts their arm in the typical "check the time" gesture. When the user's arm stops moving so the user can look at the watch, the fixed user interface establishes the watch's current position as the 0,0,0 position. From this point forward until the user moves their arm away to stop looking at the watch, onboard sensors (e.g., accelerometer and/or gyroscopes, etc.) may track the watch's motion and keep the fixed user interface at a constant position in relation to the world.

At 302, an embodiment may present a view of a portion of the fixed user interface on a display screen of the device. As an example of the foregoing and with reference to FIG. 4, a smart watch 40 is disclosed in which a portion of an underlying user interface is presented. More specifically, the entirety of the content of the underlying user interface is not displayed on the display screen of the device. In this particular situation, the content 41 currently presented on the user interface is a communication received from another individual, i.e., "Alex Tillman". As can be seen from the figure, only a portion of the communication 41 is visible on a display 42 of the smart watch 40.

At 303, an embodiment may determine whether movement of the device is detected. In an embodiment, detection of device movement may be facilitated by analyzing data obtained one or more sensors integrated within the device (e.g., a gyroscope, an accelerometer, a combination thereof, etc.). In the context of this application, movement may refer to virtually any type of movement in the x, y, or z-axis. For example, an embodiment may detect that the wearable device has moved (i.e., by nature of movement of the user's arm that the wearable device is attached to) to the left or the right, up or down, forwards towards the user or backwards away from the user, and the like.

In an embodiment, a system may not register that movement has been detected unless the movement is greater than a predetermined threshold distance. Stated differently, unless a device is determined to have moved at least a predetermined distance, an embodiment may not register that movement has been detected. Such a requirement for movement detection ensures that a device does not perform one or more downstream actions, as further described below, which may negatively affect a user's interaction experience based upon miniscule and/or unintentional device movements. In an embodiment, the predetermined distance may be a threshold standard that is originally implemented by a manufacturer of the device and that may be later adjusted by a user of the device.

Responsive to determining, at 303, that no movement of the device has been detected, an embodiment may, at 304, take no additional action. Conversely, responsive to determining, at 303, that movement of the device was detected, an embodiment may, at 305, update the view on the display with another portion of the fixed user interface. In an embodiment, the updating of the view may occur automatically in response to detection of the movement and would not require any type of additional user input to facilitate the update (e.g., another gesture, input from another hand, etc.).

Figure 4:
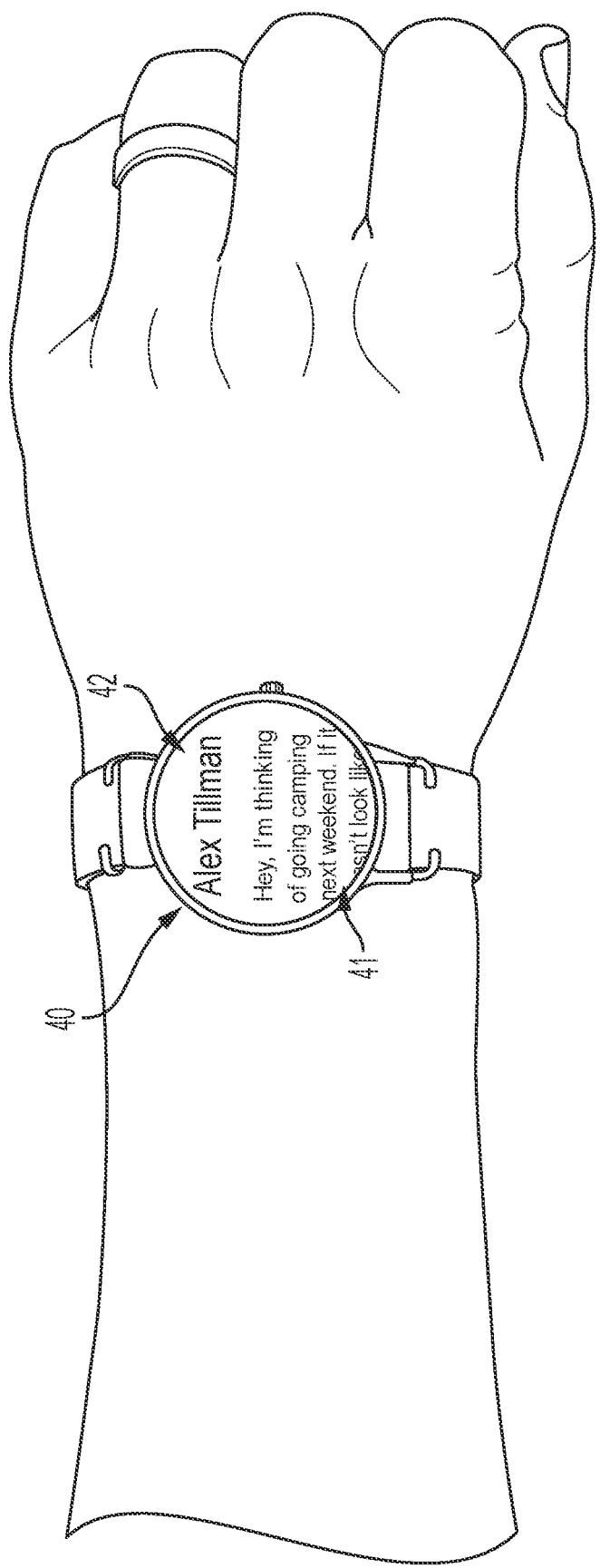
FIG. 4 illustrates an example of a user with a smart watching having a user interface.
Figure 5:
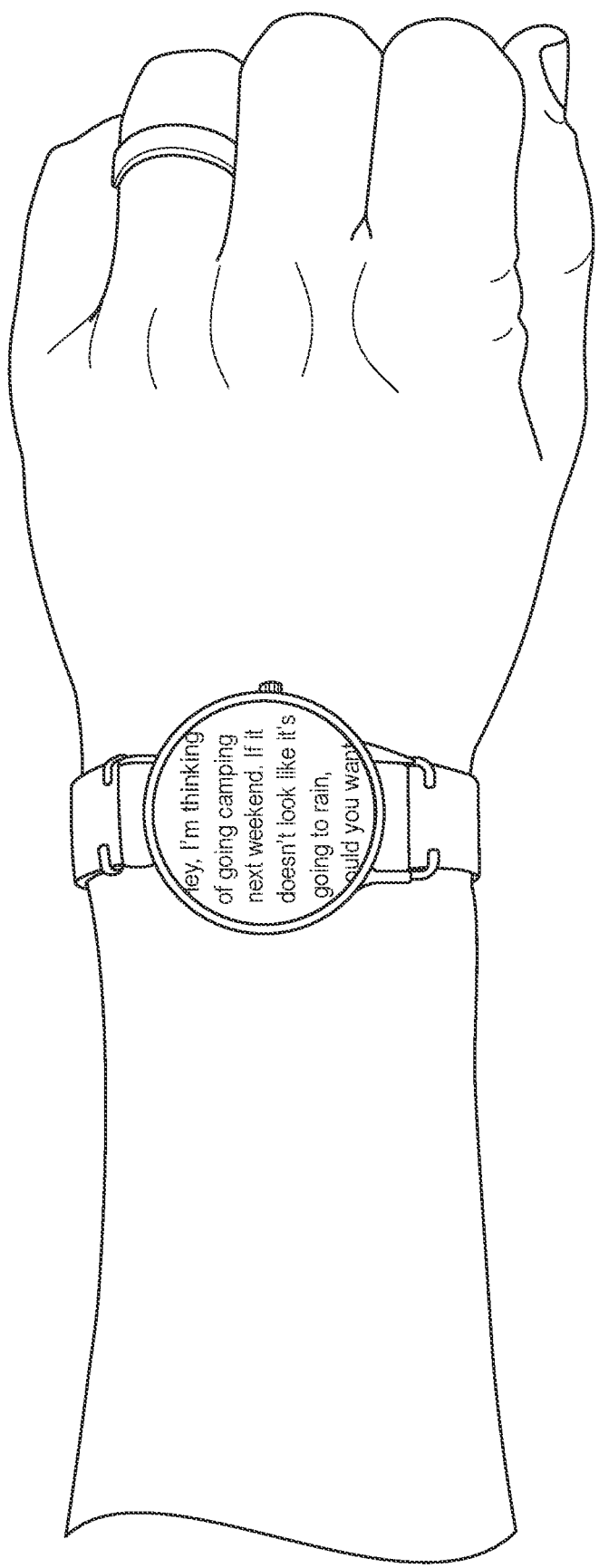
FIG. 5 illustrates another example of a user with a smart watching having a user interface.

As a non-limiting example of the foregoing, and with reference to FIG. 5, the user from FIG. 4 may desire to know the remaining contents of the message. Accordingly, the user may move their arm in a downward motion to reveal the remainder of the message. Such a system may operate in much the same as a newspaper laid flat on a table with a black sheet of paper containing a hole placed over it. The newspaper may represent the fixed user interface and as the black paper moves it serves as a window to look at different areas of the newspaper. Similarly, the user interface disclosed herein stays at a fixed position in relation to the world, and as the user moves the watch it functions as a window into different areas of the user interface.

In an embodiment, user settings may be configured to control the correlation between arm movement and content presentation. More particularly, users may toggle between a normal movement correlation and an inverted movement correlation. With respect to the former, as an example, downward movement of the user's arm may reveal new content positioned at a lower position on the fixed user interface than the originally displayed content. With respect to the latter, downward movement of the user's arm may reveal new content positioned at a higher position on the fixed user interface than the originally displayed content.

In an embodiment, a user may control one or more other devices (e.g., one or more other smart devices capable of connecting to and/or pairing with the user's wearable device, etc.) via simple motions and positioning of their wearable device. More particularly, a user may control other devices by simply aiming their wearable device at them. Such a process may be facilitated via the utilization of one or more sensors (e.g., camera sensors, etc.) integrated into the wearable device and/or conventional wireless connection techniques known in the art (e.g., near-field communication (NFC), BLUETOOTH, etc.). Responsive to achieving a successful pairing/connection, a spatial menu may appear on the wearable device. This menu may contain one or more options that a user may select from to facilitate the performance of an action on another device. For example, a user standing in proximity to a dedicated digital assistant device and pointing their wearable device at the dedicated digital assistant may be able to pair their wearable device with the dedicated digital assistant. Subsequently, a menu may appear on their wearable device with a list of actions that the dedicated digital assistant may perform (e.g., play music, play video, etc.). Such a process is much simpler than finding the device on a menu before controlling it.

Pluralities of example implementations of the inventive concepts described herein are subsequently provided. It is important to note that these examples are non-limiting and that the inventive concepts may be applicable to other scenarios not explicitly described here.

In one example, the described embodiments can optimize content scrolling actions. For instance, if a user receives a long text message (i.e., one in which the entirety of the message does not completely fit on the display screen) they would conventionally need to scroll through the message with a dial or touch input. Using the embodiments described herein, when the message is displayed on the display it is fixed in space. A user simply needs to move their arm lower to read the message. As the watch moves down, the display shows the lower portion of the message. This action can be done fluidly with only one hand.

In another example, the described embodiments may aid in the navigation around a home screen and/or through specific applications. For instance, a user may hold their arm up to see the time displayed on their watch's home screen (e.g., on a date/time widget/application, etc.). As the watch moves, the date/time widget may remain behind and a new application may be made visible on the display (e.g., a fitness tracking application, etc.). Users can customize the fixed user interface to specify where each application resides so they know which movements they need to make with their arm to quickly access them.

In yet another example, the described embodiments may be used as a unique basis for a gaming experience. More particularly, the fixed user interface may correspond to a virtual environment that a user may explore and interact with via motion of their arm. For instance, a user may move their arm around to obtain views of different aspects of the virtual environment. If there are interactive portions of the virtual environment, the user may select/interact with them via performance of a predetermined gesture (e.g., via provision of a blink pattern, a predetermined arm movement, a squeeze of the hand, etc.).

The various embodiments described herein thus represent a technical improvement to conventional methods for content navigation on a device. Using the techniques described herein, an embodiment may identify a fixed user interface on a device. An embodiment may then present a current, or original, view of a portion of the fixed user interface. Responsive to determining that movement of the device has been detected, an embodiment may update the view on the display with another portion of the fixed user interface. Such a method may enable a user to accomplish a large number of actions very quickly with only one hand.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, on an information handling device, a fixed user interface that is fixed at a location in relation to the world once an origin position is established, wherein the origin position is established responsive to identifying a user is looking at a display of the information handling device;
   presenting, on the display of the information handling device, a view of a portion of the fixed user interface and establishing the origin position of the fixed user interface based upon a starting physical position of the information handling device in space when the portion is presented on the display, wherein a remainder of the fixed user interface is not displayed on the display;
   detecting, using a processor, movement of the information handling device in space and in three-dimensional coordinates with respect to the origin position and while the user is looking at the display, wherein the detecting comprises determining whether a distance of the movement of the information handling device is greater than a predetermined threshold distance from the origin position; and updating, responsive to detecting the distance of the movement of the information handling device in space is greater than the predetermined threshold distance from the origin position, the view on the display with another portion of the remainder of the fixed user interface that was previously not displayed on the display, wherein the another portion comprises a portion of the fixed user interface corresponding to an amount of movement in the three-dimensional coordinates from the origin position.

2. The method of claim 1, wherein the information handling device is a wearable device and wherein the movement comprises movement of a body part on which the wearable device is worn.

3. The method of claim 1, wherein the detecting comprises using at least one sensor selected from the group of a gyroscope and an accelerometer.

4. The method of claim 1, wherein the updating comprises automatically updating the view without receipt of additional user input.

5. The method of claim 1, further comprising:
identifying, within the updated view of the another portion, an article of selectable content;
detecting, using a sensor, a single-handed user gesture input;
associating the single-handed user gesture input with the article of selectable content; and
activating, based on the associating, the article of selectable content.

6. The method of claim 5, wherein the article of selectable content is at least one article selected from the group consisting of an expandable list, a button, and a link.

7. The method of claim 1, further comprising resetting an origin position for the fixed user interface responsive to detecting a predetermined reset gesture.

8. The method of claim 1, further comprising:
ascertaining another device that the information handling device is directed towards;
facilitating, responsive to the ascertaining, a connection with the another device;
including, within the fixed user interface, a list of available control actions for the another device; and
controlling, via user selection of at least one control action in the list, an aspect of the another device.

9. An information handling device, comprising:
a display;
a processor;
a memory device that stores instructions executable by the processor to:
identify a fixed user interface that is fixed at a location in relation to the world once an origin position is established, wherein the origin position is established responsive to identifying a user is looking at a display of the information handling device;
present, on the display, a view of a portion of the fixed user interface and establish the origin position of the fixed user interface based upon a starting physical position of the information handling device in space when the portion is presented on the display, wherein a remainder of the fixed user interface is not displayed on the display;
detect movement of the information handling device in space and in three-dimensional coordinates with respect to the origin position and while the user is looking at the display, wherein the instructions executable by the processor to detect comprises instructions executable by the processor to determine whether a distance of the movement of the information handling device is greater than a predetermined threshold distance from the origin position; and
update, responsive to detecting the distance of the movement of the information handling device in space is greater than the predetermined threshold distance from the origin position, the view on the display with another portion of the remainder of the fixed user interface that was previously not displayed on the display, wherein the another portion comprises a portion of the fixed user interface corresponding to an amount of movement in the three-dimensional coordinates from moved from the portion in view of the origin position.

10. The information handling device of claim 9, wherein the information handling device is a wearable device.

11. The information handling device of claim 9, wherein the instructions executable by the processor to detect comprises using at least one sensor selected from the group of a gyroscope and an accelerometer.

12. The information handling device of claim 9, wherein the instructions are further executable by the processor to:
identify, within the updated view of the another portion, an article of selectable content;
detect, using a sensor, a single-handed user gesture input;
associate the single-handed user gesture input with the article of selectable content; and
activate, based on the associating, the article of selectable content.

13. The information handling device of claim 12, wherein the article of selectable content is at least one article selected from the group consisting of an expandable list, a button, and a link.

14. The information handling device of claim 9, wherein the instructions are further executable by the processor to reset an origin position for the fixed user interface responsive to detecting a predetermined reset gesture.

15. The information handling device of claim 9, wherein the instructions are further executable by the processor to:
ascertain another device that the information handling device is directed towards;
facilitate, responsive to the ascertaining, a connection with the another device;
include, within the fixed user interface, a list of available control actions for the another device; and
control, via user selection of at least one control action in the list, an aspect of the another device.

16. A product, comprising:
a storage device that stores code, the code being executable by a processor and comprising:
code that identifies a fixed user interface on an information handling device that is fixed at a location in relation to the world once an origin position is established, wherein the origin position is established responsive to identifying a user is looking at a display of the information handling device;
code that presents, on the display of the information handling device, a view of a portion of the fixed user interface and establishes the origin position of the fixed user interface based upon a starting physical position of the information handling device in space when the portion is presented on the display, wherein a remainder of the fixed user interface is not displayed on the display;

code that detects movement of the information handling device in space and in three-dimensional coordinates with respect to the origin position and while the user is looking at the display, wherein the code that detects comprises determining whether a distance of the movement of the information handling device is greater than a predetermined threshold distance from the origin position; and code that updates, responsive to detecting the distance of the movement of the information handling device in space is greater than the predetermined threshold distance from the origin position, the view on the display with another portion of the remainder of the fixed user interface that was previously not displayed on the display, wherein the another portion comprises a portion of the fixed user interface corresponding to an amount of movement in the three-dimensional coordinates from the origin position.

\* \* \* \* \*